(12) United States Patent
Entzminger et al.

(10) Patent No.: US 11,209,801 B2
(45) Date of Patent: Dec. 28, 2021

(54) INDUSTRIAL PROCESS HISTORIAN TIME SYNCHRONIZATION OF SOURCE BASED TIMESTAMP EVENT DATA

(71) Applicant: Rockwell Automation Technologies, Inc., Mayfield Heights, OH (US)

(72) Inventors: Rob A. Entzminger, Shawnee, KS (US); David C. Mazur, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 25 days.

(21) Appl. No.: 16/894,133

(22) Filed: Jun. 5, 2020

(65) Prior Publication Data

US 2021/0011464 A1     Jan. 14, 2021

Related U.S. Application Data

(63) Continuation of application No. 16/184,752, filed on Nov. 8, 2018, now Pat. No. 10,678,223, which is a continuation of application No. 15/137,484, filed on Apr. 25, 2016, now Pat. No. 10,126,736.

(51) Int. Cl.
*G05B 19/418* (2006.01)

(52) U.S. Cl.
CPC ... *G05B 19/41835* (2013.01); *G05B 19/4183* (2013.01); *G05B 2219/31288* (2013.01); *G05B 2219/31455* (2013.01); *G05B 2219/31462* (2013.01); *G05B 2219/34413* (2013.01); *Y02P 90/02* (2015.11)

(58) Field of Classification Search
CPC .......... G05B 19/41835; G05B 19/4183; G05B 2219/31288; G05B 2219/31462; G05B 2219/31455; G05B 2219/34413; Y02P 90/12; Y02P 90/10
See application file for complete search history.

(56) References Cited

U.S. PATENT DOCUMENTS

| | | | | |
|---|---|---|---|---|
| 5,886,995 A | * | 3/1999 | Arsenault | .......... H04N 21/2662 370/477 |
| 6,292,887 B1 | * | 9/2001 | Janniello | ............. G06F 9/30087 712/213 |
| 6,339,790 B1 | * | 1/2002 | Inoue | ...................... H04L 41/00 709/224 |
| 7,594,226 B2 | * | 9/2009 | Stelzer | .................... G06F 30/34 717/178 |

(Continued)

*Primary Examiner* — Ramesh B Patel

(57) ABSTRACT

Provided herein are systems, methods, and software for preserving timestamp data in an industrial automation environment. In one implementation, one or more computer-readable storage media having program instructions stored thereon to preserve timestamp data in an industrial automation environment, wherein the program instructions, when executed by a computing system, direct the computing system to at least receive, at a controller, event data of an event from an electronic device, wherein the event data comprises a status of the event and the timestamp of the event. The program instructions also direct the computing system to determine an identification value based on the event data and load the status of the event, the timestamp of the event, and the identification value to a queue within the controller. The timestamp of the event includes the timestamp transmitted from the electronic device.

20 Claims, 10 Drawing Sheets

(56) References Cited

U.S. PATENT DOCUMENTS

| | | | | |
|---|---|---|---|---|
| 7,823,121 | B1 | 10/2010 | Zarrinkoub et al. | |
| 8,416,812 | B2* | 4/2013 | Radulescu | H04J 3/0667 |
| | | | | 370/503 |
| 8,599,277 | B2* | 12/2013 | Fleming | H04N 21/23424 |
| | | | | 348/222.1 |
| 10,126,736 | B2* | 11/2018 | Entzminger | G05B 19/41835 |
| 10,678,223 | B2* | 6/2020 | Entzminger | G05B 19/4183 |
| 2006/0037008 | A1 | 2/2006 | Stelzer et al. | |
| 2010/0118895 | A1* | 5/2010 | Radulescu | H04J 3/0667 |
| | | | | 370/503 |
| 2010/0135643 | A1* | 6/2010 | Fleming | H04N 5/76 |
| | | | | 386/224 |
| 2011/0258262 | A1* | 10/2011 | Bezdicek | H04L 67/2823 |
| | | | | 709/206 |
| 2011/0258359 | A1* | 10/2011 | Bezdicek | H04L 69/14 |
| | | | | 710/306 |
| 2011/0258637 | A1* | 10/2011 | Bezdicek | G05B 19/4185 |
| | | | | 719/314 |
| 2012/0331352 | A1* | 12/2012 | Guenther | G05B 19/0426 |
| | | | | 714/38.1 |
| 2017/0343996 | A1* | 11/2017 | Venne | G06Q 10/06 |

\* cited by examiner

| InputValue | LimitValue | Quality | EventAssociationID | UserComment | UserComputerID | Tag1Value | Tag2Value |
|---|---|---|---|---|---|---|---|
| 1 | 0 | 192 | F302DB14-115F-42D4-93D5-734AF54DE092 | NULL | NULL | 1972454943871698 | 297 |
| 0 | 0 | 192 | F302DB14-115F-42D4-93D5-734AF54DE092 | NULL | NULL | 1372454948905083 | 297 |

INDUSTRIAL PROCESS HISTORIAN TIME SYNCHRONIZATION OF SOURCE BASED TIMESTAMP EVENT DATA

RELATED APPLICATIONS

This application is a continuation of, and claims priority to, U.S. patent application Ser. No. 16/184,752, filed on Nov. 8, 2018 and entitled "Industrial Process Historian Time Synchronization of Source Based Timestamp Event Data", which is a continuation of, and claims priority to, U.S. patent application Ser. No. 15/137,484, filed on Apr. 25, 2016, and entitled "Industrial Process Historian Time Synchronization of Source Based Timestamp Event Data," both of which are hereby incorporated by reference in their entirety.

TECHNICAL FIELD

Aspects of the disclosure are related to the field of industrial automation control systems.

TECHNICAL BACKGROUND

FIG. 1 shows a traditional process historian system that includes a controller 10, a data server 12, an interface node 14, and a historian database or repository 16. Typically, an event timestamp is applied at the interface node 14. Interface nodes 14 collect, interrogate, and qualify information provided by the data server 12. If the data values collected at the interface node 14 exceed pre-defined dead band thresholds, a timestamp is applied, and the data is transferred to the historian repository 16. If the data does not exceed the threshold, the data point is disregarded and not archived. This process is better known as exception testing.

In the system shown in FIG. 1, the event that is passed to the interface node 14 is value based, not time driven. That is, the controller 10 does not provide a timestamp to the data server 12, but only a process value. This procedure for collecting and timestamping data does not work well for events that are time stamped at the source device such as an Intelligent Electronic Devices (IED). After the IED has determined that an exception has occurred, a timestamp is generated by IED and applied to the event before the data is transmitted to the process historian system. Using a value-based exception reporting such as that shown in FIG. 1 will not transfer meaningful timestamps from the IED to the historian repository 16.

Overview

Provided herein are systems, methods, and software for preserving timestamp event data from an IED in a process historian. In one implementation, one or more computer-readable storage media having program instructions stored thereon to preserve timestamp data in an industrial automation environment, wherein the program instructions, when executed by a computing system, direct the computing system to at least receive, at a controller, event data of an event from an electronic device, wherein the event data comprises a status of the event and the timestamp of the event. The program instructions also direct the computing system to determine an identification value based on the event data and load the status of the event, the timestamp of the event, and the identification value to a queue within the controller. The timestamp of the event includes the timestamp transmitted from the electronic device.

In another implementation, a method to preserve timestamp data in an industrial automation environment includes receiving, at a controller, event data of an event from an electronic device, wherein the event data comprises a status of the event and the timestamp of the event. The method also includes determining an identification value based on the event data and loading the status of the event, the timestamp of the event, and the identification value to a queue within the controller. The timestamp of the event comprises the timestamp transmitted from the electronic device.

In another implementation, a system to preserve timestamp data in an industrial automation environment includes a controller, a gateway device and a transaction management module coupled to the controller, and a historian repository coupled to the transaction management module. The gateway device is configured to receive first event data of a first event from an industrial device and transmit the first event data to the controller without modifying the first event data, wherein the first event data comprises a status of the event and the timestamp of the event. The controller is programmed to receive the first event data from the gateway device; determine an identification value based on the first event data; and load the status of the first event, the timestamp of the first event, and the identification value of the first event to a queue within the controller. The transaction management module is configured to retrieve the first event data from the controller, and store the first event data in the historian repository.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
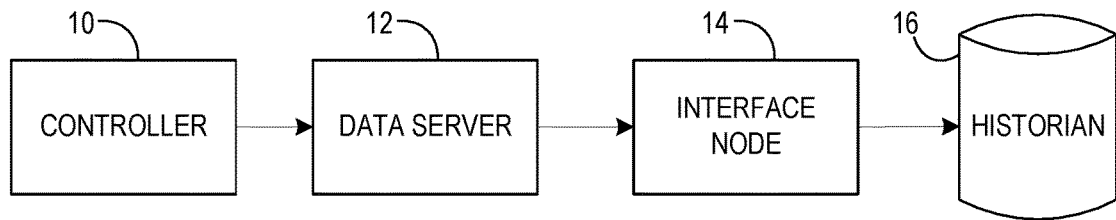
FIG. 1 illustrates a traditional process historian system.
Figure 2:
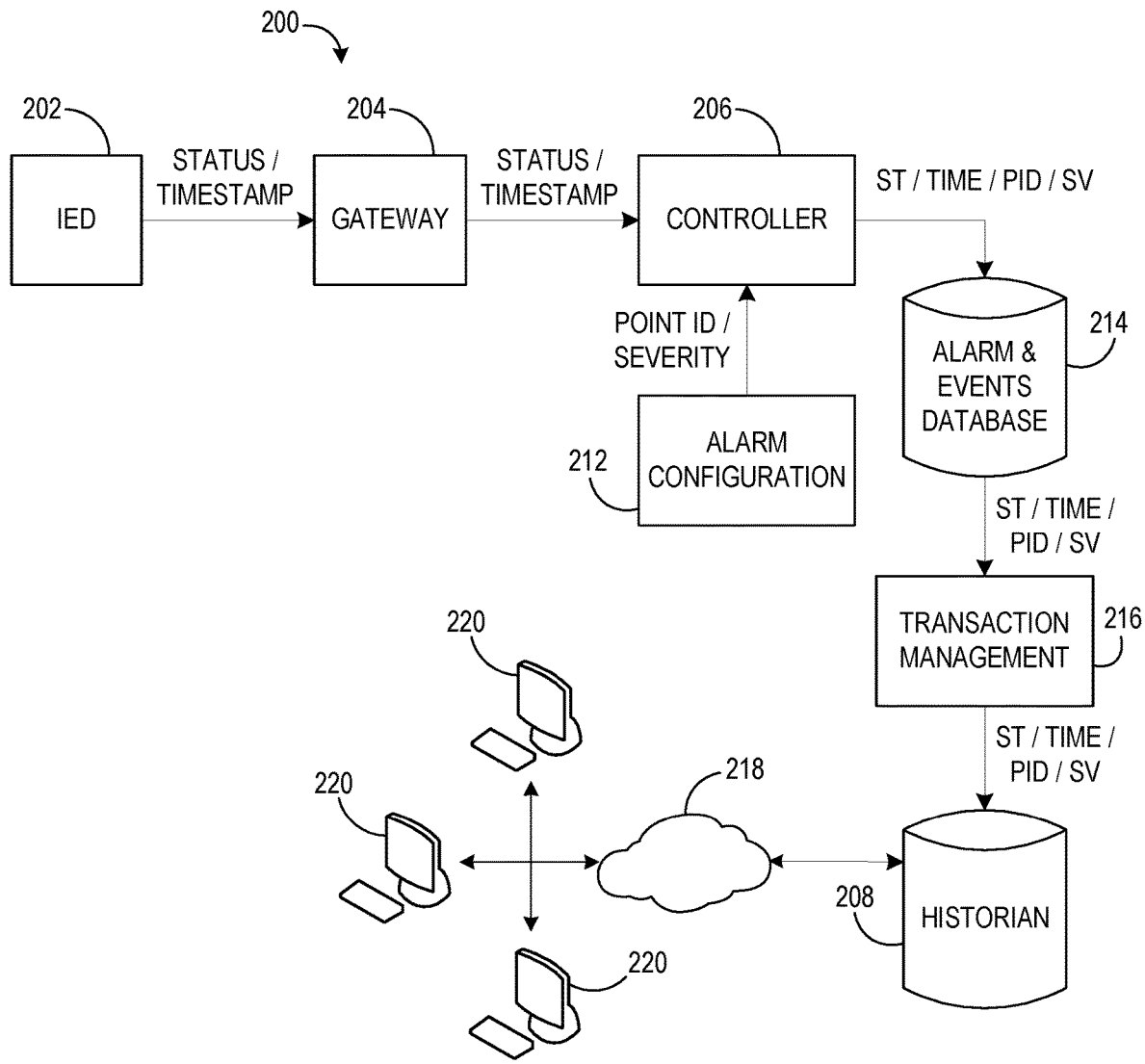
FIG. 2 illustrates an IED system with a process control data historian in an exemplary implementation.

FIG. 2 illustrates an IED system 200 with a process control data historian according to one embodiment. An IED 202, such as a relay, is configured to transmit event data when a defined event occurs using, in one embodiment, a IEC 61850 communications protocol. For example, the IED 202 may put a data packet together when an event occurs that includes a status/value of the event and a timestamp of when the event occurred. The data packet may also include a quality of the event in one embodiment.

The IED 202 is coupled to a gateway 204 for communicating the data packet to a controller 206 for processing. The IED 202 may be coupled to gateway 204 via an Ethernet connection; however, other forms of connections are also contemplated herein. The IED 202 communicates the data packet for delivery to the controller 206 so that the event data and timestamp that are created at the IED 202 travel together from the source of the event to the controller 206. The event status and timestamp that are generated on the event by the IED 202 are passed through the gateway 204 to the controller 206 unaltered. In this way, the event time set or determined by IED 202 remains with the event data and is not overwritten or determined by the controller.

Figure 3:
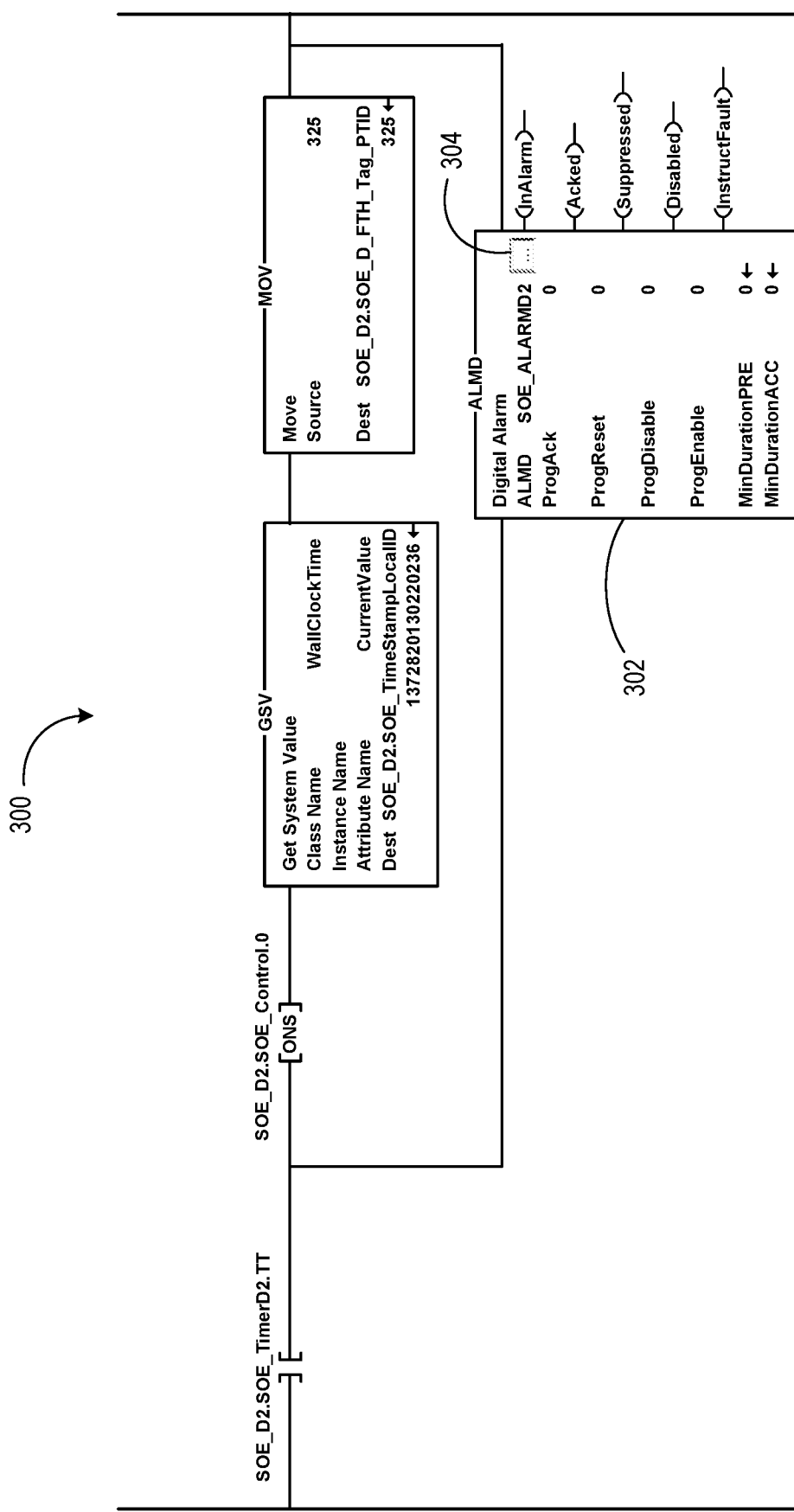
FIG. 3 illustrates an example of event alarm analization logic in an exemplary implementation.

Although the controller 206 has been passed both the event value and IED timestamp, it is not inherently passed to a historian database or repository 208. Controller 206 is programmed with logic to analyze the data packet to determine if the event matches one or more criteria that determine if the event is to be stored in the historian repository 208. FIG. 3 illustrates an example of event alarm analyzation logic. In order to persist an event with a historian tag, the configuration of an ALMD (Digital Alarm) instruction associates the event to the point ID of the historian tag. An historian point ID is a unique identifier for a tag in the historian repository 208.

Via an alarm configuration 212, a plurality of alarms may be created and set up to handle specific events from IED 202. FIG. 3 illustrates a portion of a control logic 300 configured to associate the event to the point ID of the historian tag. The pointID includes an identification code to be stored in the historian repository 208 for an identified event from the IED 202. The pointID is tied to a part of the name of the event data that gets passed from the IED 202.

Figures 4, 5:
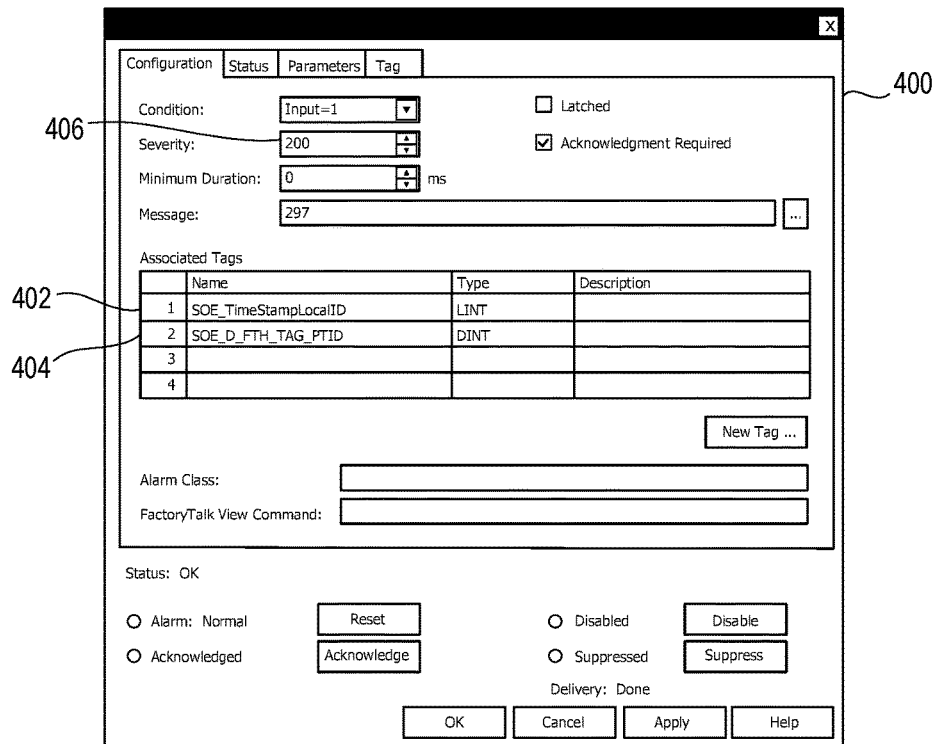
FIG. 4 illustrates an alarm properties user form in an exemplary implementation.
FIG. 5 illustrates a ConditionEvent Table in an exemplary implementation.

Configuration of an ALMD instruction 302 includes setting its properties by a user. In an example, the user may click an alarm property setup button 304 in the control logic 300 and set the ALMD instruction properties in a user form 400 as illustrated in FIG. 4. In user form 400, the user may associate an IED timestamp 402 and a point ID 404 with the ALMD instruction 302. A severity property 406 provide a way for control logic 300 to differentiate tags as electrical distribution tags.

Referring back to FIG. 2, when an alarm occurs, the following parameters are known: timestamp of IED, unique point ID, timestamp of entering alarm, value of alarm, and the Event Association ID. Controller 206 analyzes the event status, for example, in the data packet to see if the event status matches any of the ALMD instructions 302 in the set of alarms set up in the alarm configuration 212. If there is a match, controller 206 causes the event information to be stored in an alarm and events database 214. In one embodiment, a ConditionEvent Table 500 (shown in FIG. 5) in the alarm and events database 214 is populated. As shown in FIG. 5, the ConditionEvent Table 500 shows the InputValue, EventAssociationID, Tag1Value (IED timestamp), and Tag2Value (point ID). FIG. 5 also shows the off/on and on/off transition of an alarm event, represented by EventAssociationIDs being equal.

Referring again to FIG. 2, from the alarm and events database 214, a transaction management module 216 transfers the event data to the historian repository 208. A communication network 218 coupled to historian repository 208 is configured to deliver reports, data trends, or other information to computers or terminals 220 connected thereto. Communication network 218 may be an Internet network, an intranet network, or the like and may be coupled to terminals 220 via wired or wireless connections.

IED system 200 thus stores meaningful event data in the historian repository 208. The controller 206 determines when an event satisfied the severity value and passes the status, timestamp, pointID, and severity of the event on to be stored in the historian repository 208.

While historian repository 208 stores meaningful event data via the embodiment illustrated in FIG. 2, the processing ability of the controller 206 to compare event data with alarm data in the alarm configuration 212 is diverted from other processes that the controller 206 is programmed to perform. In a typical industrial automation scenario, controller 206 is tasked with other duties related to the automation environment and system. In a preferred embodiment, the amount of time that controller 206 spends addressing event data from IEDs such as IED 202 is reduced so that controller 206 is diverted away from its other duties as little as possible.

Figure 6:
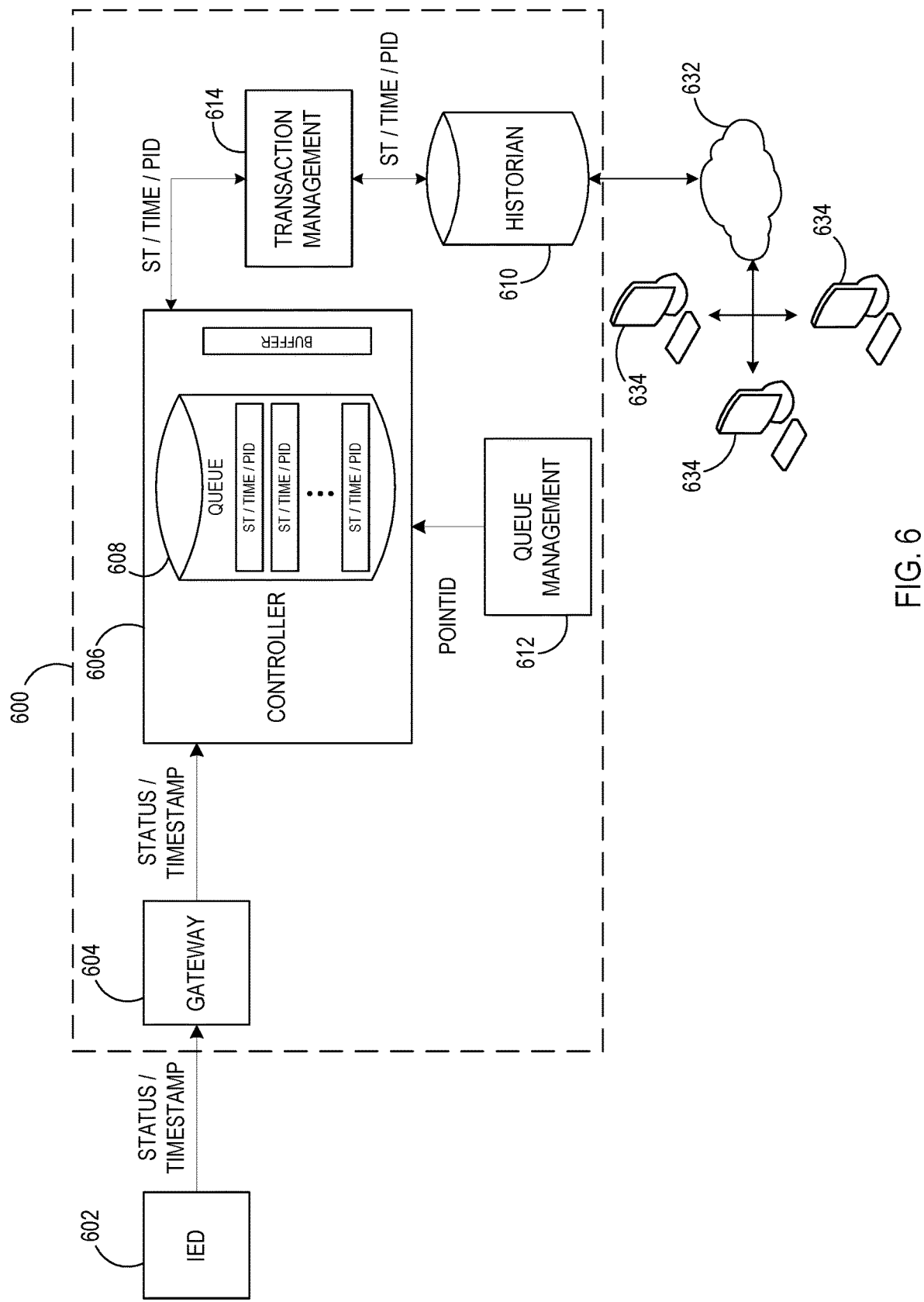
FIG. 6 illustrates an IED system with a process control data historian in an exemplary implementation.
Figure 7:
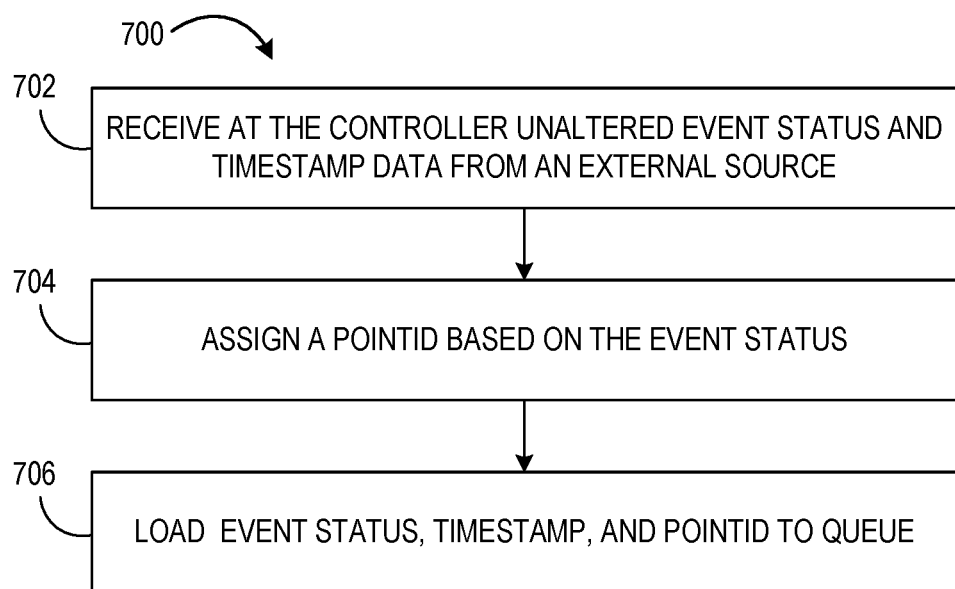
FIG. 7 illustrates a flow diagram that illustrates an operation of a computing system in an exemplary implementation.

FIG. 6 illustrates an embodiment of an IED system 600 configured to reduce the amount of time a system controller spends with the processing of event data compared with that shown in FIG. 2. FIG. 7 is a flow diagram that illustrates an operation 700 of a computing system such as IED system 600 in an exemplary implementation. The operation 700 shown in FIG. 7 may also be referred to as queue process 700 herein. The steps of the operation 700 are indicated below parenthetically as the discussion of operation 700 will proceed with the description of FIGS. 6 and 8 in order to illustrate its operations. The details provided in FIG. 6 are merely exemplary with regard to operation 700, however, and are not intended to limit the scope of process 700 to the specific implementation shown in FIG. 6.

As shown, IED system 600 includes an IED 602, such as a relay external to system 600, configured to transmit event data when a defined event occurs. Similar to IED 202, IED 602 may put a data packet together when an event occurs that includes a status of the event, a timestamp of when the event occurred, and an event quality if desired.

The IED 602 is coupled to a gateway device 604 for communicating the data packet to a controller 606 for processing via an Ethernet connection or other form of connection. The IED 602 communicates the data packet for delivery to the controller 606 so that the event data and timestamp that are created at the IED 602 travel together from the source of the event to the controller 606 and eventual repository. The event status and timestamp that are generated on the event by the IED 602 are passed through the gateway 604 to the controller 606 without the gateway 604 generating a new timestamp that differs from the event timestamp. Thus, the controller 606 receives the event status and timestamp in a form unaltered by the gateway 604 (702 of operation 700). In this way, the event time set or determined by IED 602 remains with the event data and is not overwritten or determined by the gateway 604 or controller 606.

Controller 606 is programmed with logic to recognize events as they are received from IED 602 and to cause them to be saved in a queue 608 within the memory of the controller 606 before being eventually saved in a historian database or repository 610. In one embodiment, queue 608 is a first-in-first-out (FIFO) queue although other types of queues are contemplated herein. Controller 606 is programmed with control logic via a queue management 612 that assigns a pointID for an event status desired to be saved to in the historian repository 610 (704 of operation 700). The pointID is assigned based on a portion of the event data that identifies an origin of the event (e.g., such as a unique IED name).

Figure 8:
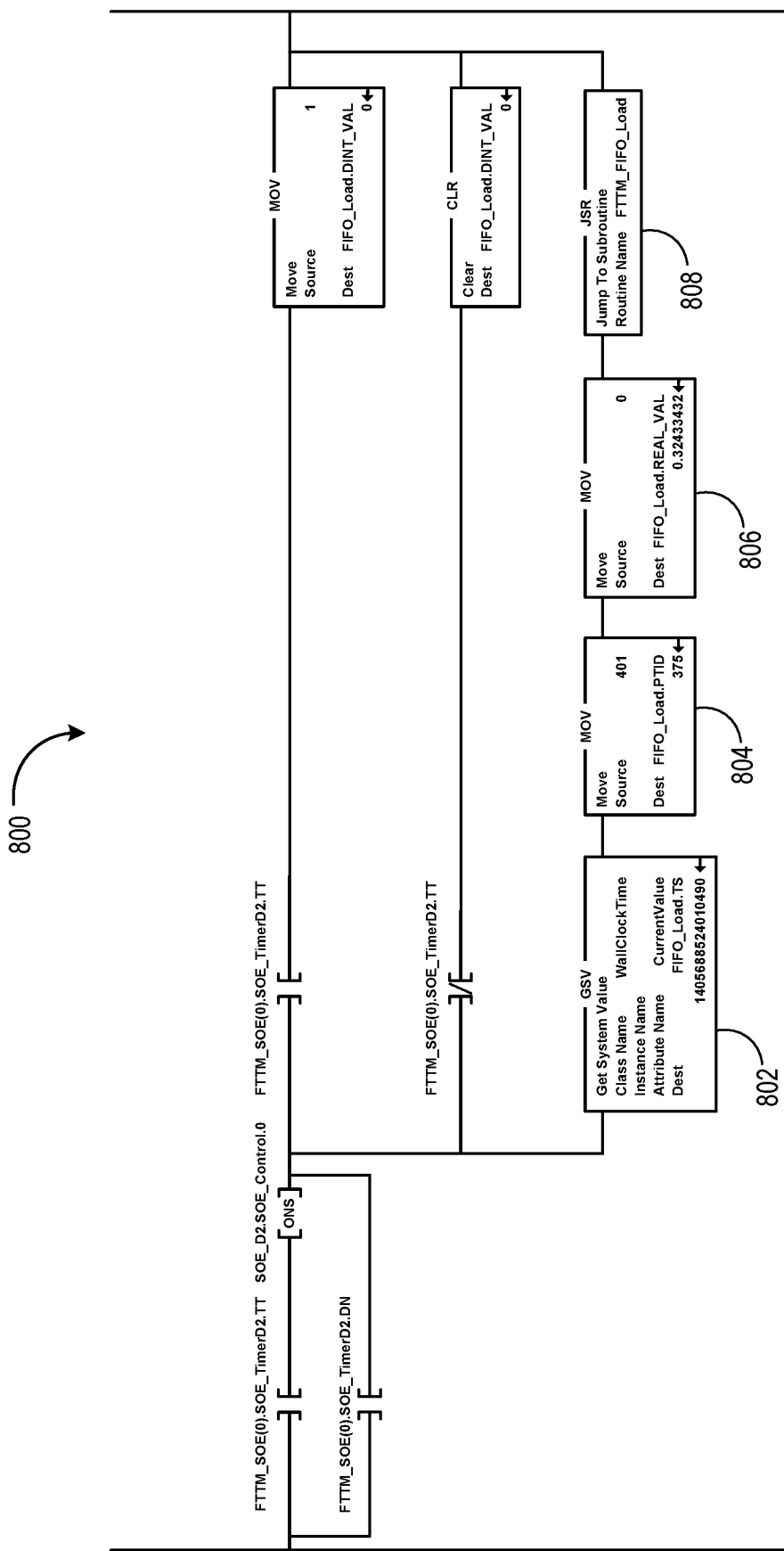
FIG. 8 illustrates an example of controller logic transferring event data to a queue in an exemplary implementation.

An example of such control logic is illustrated in FIG. 8. A portion of a control logic program 800 is illustrated that assigns the pointID and loads data to the queue 608 if the event is found in the control logic. A Get System Value control block 802 sets a destination in the FIFO queue 608 for the timestamp of the event. A Move control block 804 sets a destination in the FIFO queue 608 for the pointID assigned to the event. Another Move control block 806 sets a destination in the FIFO queue 608 for the status value of the event. Finally, a Jump to Subroutine control block 808 loads the values in the queue 608 (706 of operation 700). By saving the data to memory with the controller and not processing an alarm to store the data in an alarm and events database as described above in FIG. 2, controller 606 spends less time handling the event data and can move on to other processing duties in the automation environment control process.

Figure 10:
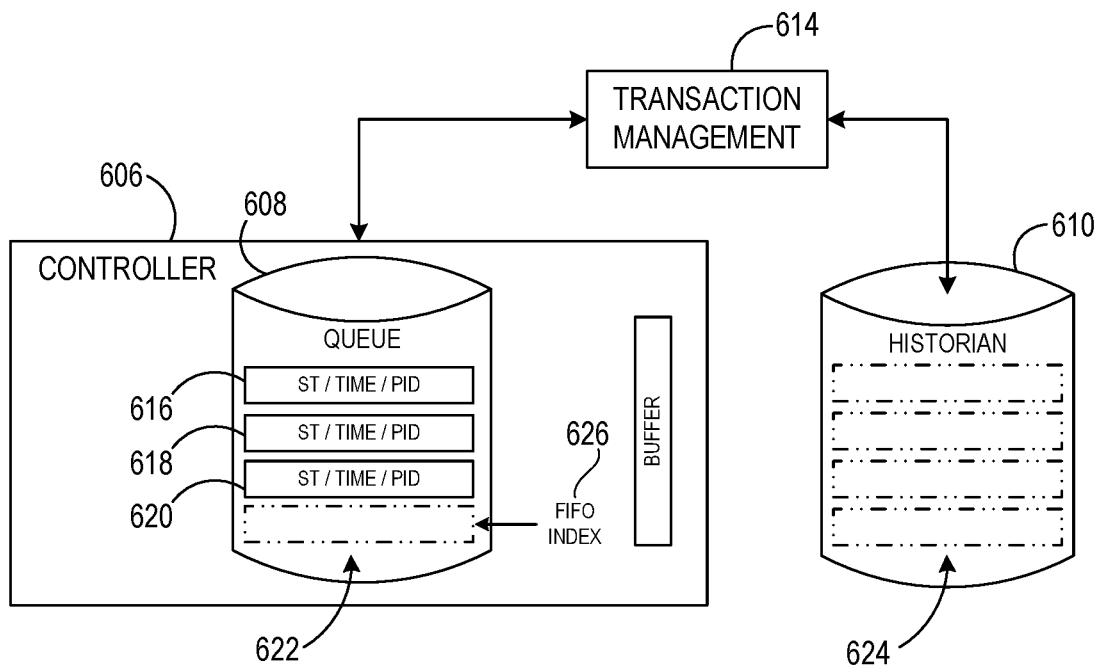
FIGS. 10-12 illustrate block diagrams showing the transfer of data from the controller to the historian repository of FIG. 6 in an exemplary implementation.
Figure 11:
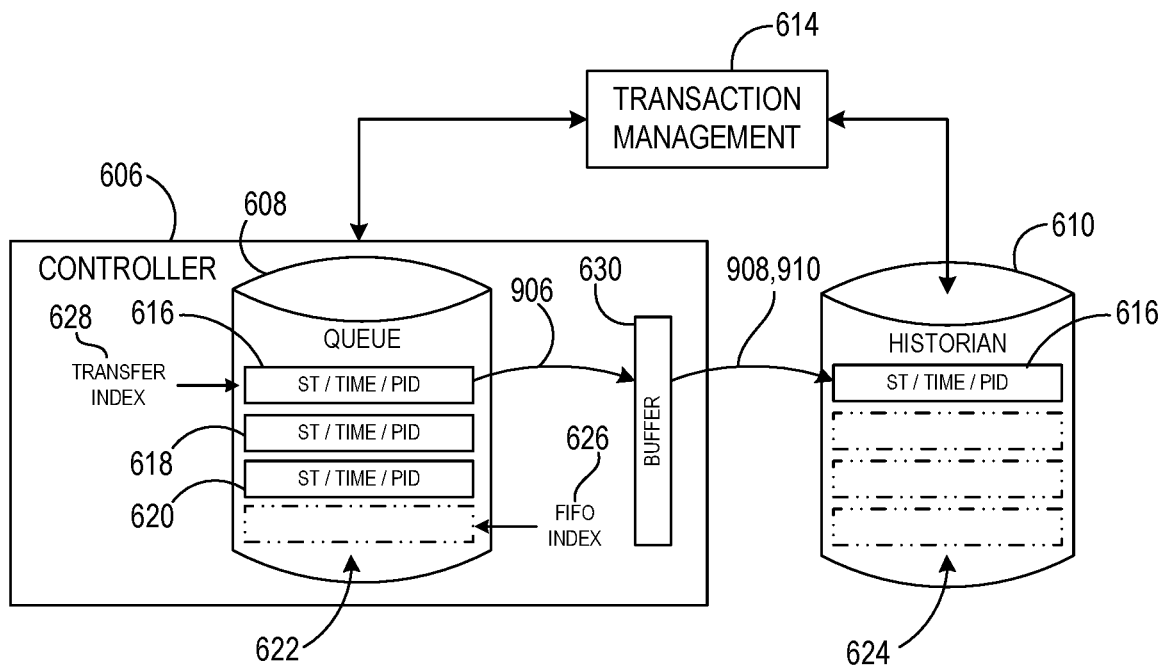
Figure 12:
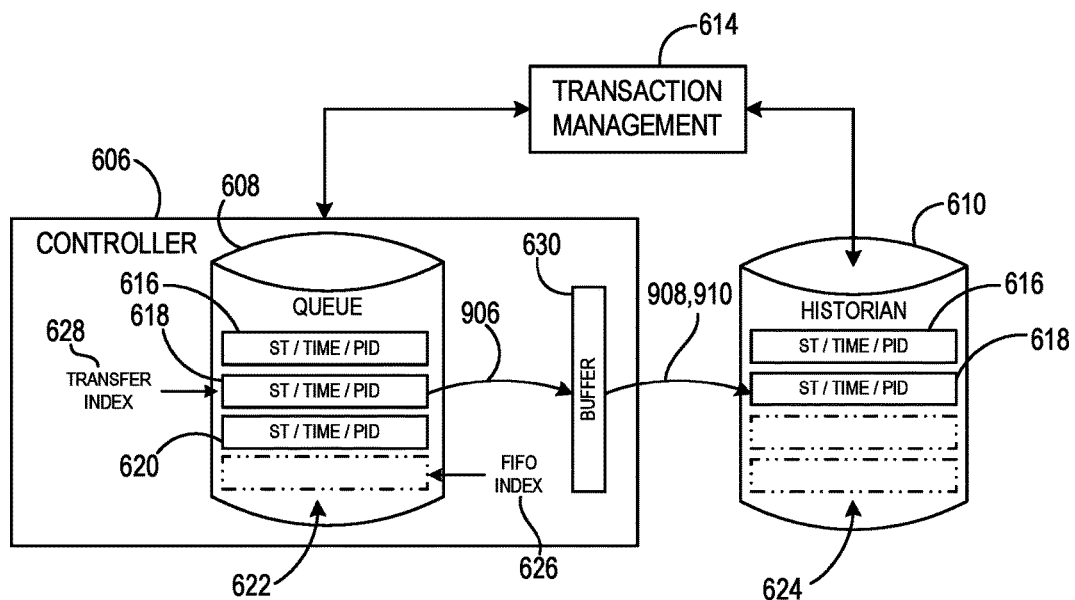

Referring back to FIG. 6, the transfer of the data from the queue 608 to the historian repository 610 is handled by a transaction management module 614, saving the controller 606 from spending the processing time to perform the transfer. FIGS. 10-12 illustrate block diagrams showing the transfer of data from controller 606 to the historian repository 610.

Figure 9:
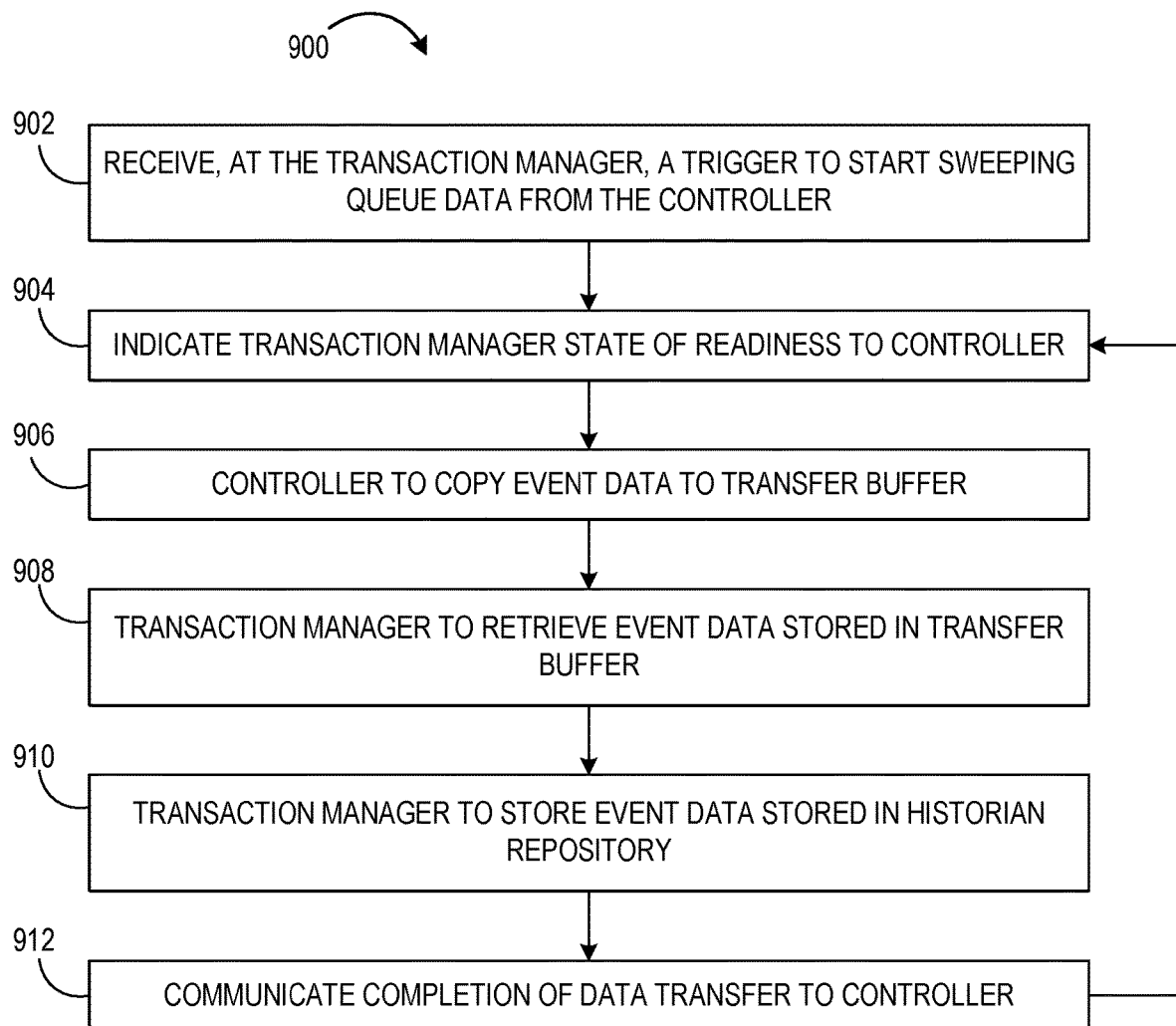
FIG. 9 illustrates a flow diagram that illustrates an operation of a computing system in an exemplary implementation.

FIG. 9 is a flow diagram that illustrates an operation 900 of a computing system such as IED system 600 in an exemplary implementation for transferring data from queue 608 to historian repository 610. The operation 900 shown in FIG. 9 may also be referred to as transaction management process 900 herein. In one embodiment, transaction management 614 includes a processor or controller configured to perform transaction management process 900. The steps of the operation 900 are indicated below parenthetically as the discussion of operation 900 will proceed with the description of FIG. 6 and FIGS. 10-12 in order to illustrate its operations. The details provided in these figures are merely exemplary with regard to operation 900, however, and are not intended to limit the scope of process 900 to the specific implementation shown.

FIG. 10 graphically illustrates putting data into the FIFO queue 608. As shown, three events 616-620 are stored in memory locations 622 within queue 608. FIG. 10 also graphically illustrates memory locations 624 within historian repository 610 for storing event data from queue 608 (as discussed below with respect to FIGS. 11, 12). To store new data into the FIFO queue 608, a FIFO index 626 of the FIFO queue 608 points to the next memory location 622 within the FIFO queue 608 in which to store the new data. FIFO index 626 may be changed to point to the next memory location 622 when there is new data to be stored, in one embodiment, or it may be changed to point to the next memory location 622 after storing the previous data, in an alternative embodiment. As shown in FIG. 10, queue 608 has been filled with data waiting to be transferred to the historian repository 610. The storing of the new data into the FIFO queue 608 indicates that there are one or more events within the controller 606 that need to be persisted to the historian repository 610, and a trigger is sent to transaction management 614 to start sweeping the data from the controller 606 (902 of FIG. 9).

FIGS. 11 and 12 graphically illustrate pulling data out of the FIFO queue 608 for storage in the historian repository 610. In FIG. 11, after the transaction management 614 receives the trigger from controller 606, it begins moving a copy of the events 616-620 stored in queue 608 to the memory locations 624 in the historian repository 610. To acquire data for the next event to be transferred, transaction management 614 indicates to controller 606 that it is ready for the next event data (904 of FIG. 9). Beginning with the first-stored event data in memory locations 622 in the case of a FIFO protocol and pointed to by a transfer index 628, controller 606 puts a copy of the indexed event in a transfer buffer 630 (906 of FIG. 9) comprising memory within controller 606. Transaction management 614 retrieves the data stored in the transfer buffer 630 (908 of FIG. 9) and copies it to an open memory location in memory locations 624 of historian repository 610 (910 of FIG. 9). In FIG. 12, transaction management 614 communicates completion of the data transfer of event 616 to controller 606 (912 of FIG. 9), and while other events (618-620) exist that need to be transferred to historian repository 610, controller 606 moves transfer index 628 to the next event to be transferred (return to 904 of FIG. 9). Transaction management 614 then repeats transfer of the next event, and the cycle illustrated in FIGS. 11 and 12 continues until all the data has been transferred.

Referring back to FIG. 6, a communication network 632 coupled to historian repository 610 is configured to deliver reports, data trends, or other information to computers or terminals 634 connected thereto. Communication network 632 may be an Internet network, an intranet network, or the like and may be coupled to terminals 634 via wired or wireless connections.

In an FIFO system, transfer index 628 begins by pointing to the first-entered data until that data has been transferred. Then, as described above, transfer index 628 is modified to point to the next-entered data. In one embodiment, once all of the events 616-620 have been transferred to historian repository 610, transfer index 628 may remain pointing at the last-transferred data memory location until another event is stored in queue 608. Alternatively, transfer index 628 may be modified to point to the next location in memory location 622 in which the next event will be stored as indicated by FIFO index 626. In either case, in time for the transaction management 614 to again transfer data, transfer index 628 will indicate the next event written in memory location 622 to be transferred. When an end of the block of memory set aside for queue 608 is reached, FIFO index 626 wraps around to the start of the block of queue memory.

Figure 13:
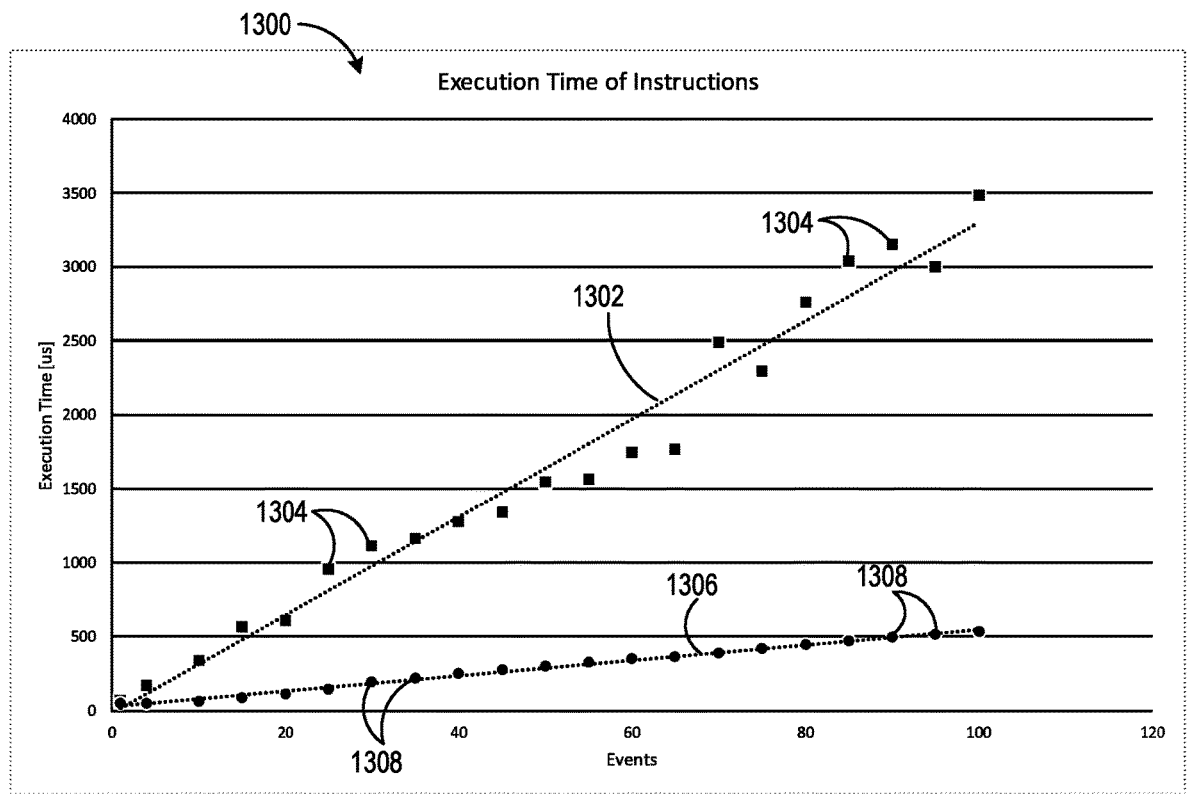
FIG. 13 illustrates an execution time plot in an exemplary implementation.

As mentioned above, the IED system 600 shown in FIG. 6 is configured to reduce the amount of time a system controller spends with the processing of event data compared with that shown in FIG. 2. FIG. 13 illustrates a plot 1300 showing an exemplary improvement in the execution time the embodiment shown in FIG. 6 has over that shown in FIG. 2. A first curve 1302 illustrates a first plurality of events 1304 simulated for the process and system shown in FIG. 2. A second curve 1306 illustrates a second plurality of events 1308 simulated for the process and system shown in FIG. 6. As shown, an improvement in the execution time of a given number of events by the system of FIG. 6 allows controller 606 to spend less time processing events and to spend more time processing other tasks. As a result, the efficiency of controller 606 is improved.

Figure 14:
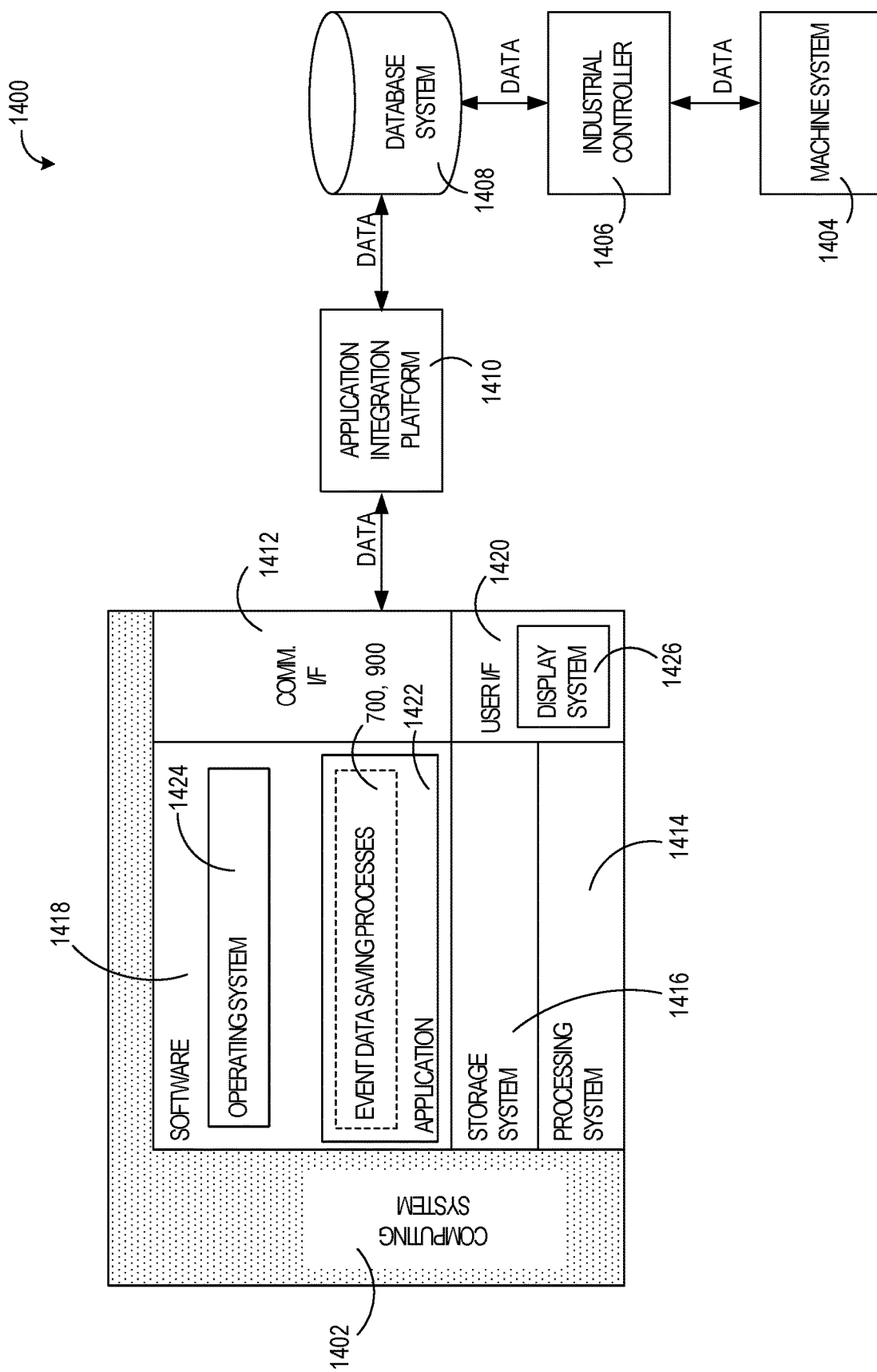
FIG. 14 illustrates an industrial automation environment in an exemplary implementation.

Turning now to FIG. 14, a block diagram that illustrates an industrial automation environment 1400 in an exemplary implementation is shown. Industrial automation environment 1400 provides an example of an industrial automation environment that may be utilized to implement the queue process 700 and transaction management process 900 (referred together as "event data saving processes") disclosed herein, but other environments could also be used. Industrial automation environment 1400 includes computing system 1402, machine system 1404, industrial controller 1406, database system 1408, and application integration platform 1410. Machine system 1404 and controller 1406 are in communication over a communication link, controller 1406 and database system 1408 communicate over a communication link, database system 1408 and application integration platform 1410 communicate over a communication link, and application integration platform 1410 and computing system 1402 are in communication over a communication link. Note that there would typically be many more machine systems in most industrial automation environments, but the number of machine systems shown in FIG. 14 has been restricted for clarity.

Industrial automation environment 1400 comprises an automobile manufacturing factory, food processing plant, oil drilling operation, microprocessor fabrication facility, or some other type of industrial enterprise. Machine system 1404 could comprise a sensor, drive, pump, filter, drill, motor, robot, fabrication machinery, mill, printer, or any other industrial automation equipment, including their associated control systems. A control system comprises, for example, industrial controller 1406, which could include automation controllers, programmable logic controllers (PLCs), programmable automation controllers (PACs), or any other controllers used in automation control. Additionally, machine system 1404 could comprise other industrial equipment, such as a brew kettle in a brewery, a reserve of coal or other resources, or any other element that may reside in an industrial automation environment 1400.

Machine system 1404 continually produces operational data over time. The operational data indicates the current status of machine system 1404, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 1404 and/or controller 1406 is capable of transferring the operational data over a communication link to database system 1408, application integration platform 1410, and computing system 1402, typically via a communication network. Database system 1408 could comprise a disk, tape, integrated circuit, server, or some other memory device. Database system 1408 may reside in a single device or may be distributed among multiple memory devices.

Application integration platform 1410 comprises a processing system and a communication transceiver. Application integration platform 1410 may also include other components such as a router, server, data storage system, and power supply. Application integration platform 1410 provides an example of application server 130, although server 130 could use alterative configurations. Application integration platform 1410 may reside in a single device or may be distributed across multiple devices. Application integration platform 1410 may be a discrete system or may be integrated within other systems—including other systems within industrial automation environment 1400. In some examples, application integration platform 1410 could comprise a FactoryTalk® VantagePoint server system provided by Rockwell Automation, Inc.

The communication links over which data is exchanged between machine system 1404, industrial controller 1406, database system 1408, application integration platform 1410, and communication interface 1412 of computing system 1402 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 1402 may be representative of any computing apparatus, system, or systems on which the event data saving processes disclosed herein or variations thereof may be suitably implemented. Computing system 1402 provides an example of a computing system that could be used as either a server or a client device in some implementations, although such devices could have alternative configurations. Examples of computing system 1402 include mobile computing devices, such as cell phones, tablet computers, laptop computers, notebook computers, and gaming devices, as well as any other type of mobile computing devices and any combination or variation thereof. Examples of computing system 1402 also include desktop computers, server computers, and virtual machines, as well as any other type of computing system, variation, or combination thereof. In some implementations, computing system 1402 could comprise a mobile device capable of operating in a server-like fashion which, among other uses, could be utilized in a wireless mesh network.

Computing system 1402 includes processing system 1414, storage system 1416, software 1418, communication interface 1412, and user interface 1420. Processing system 1414 is operatively coupled with storage system 1416, communication interface 1412, and user interface 1420.

Processing system 1414 loads and executes software 1418 from storage system 1416. Software 1418 includes application 1422 and operating system 1424. Application 1422 may include event data saving processes 700, 900 in some examples. When executed by computing system 1402 in general, and processing system 1414 in particular, software 1418 directs computing system 1402 to operate as described herein for event data saving processes 700, 900 or variations thereof. In this example, user interface 1420 includes display system 1426, which itself may be part of a touch screen that also accepts user inputs via touches on its surface. Computing system 1402 may optionally include additional devices, features, or functionality not discussed here for purposes of brevity.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
   a memory that stores executable components; and
   a processor, operatively coupled to the memory, that executes the executable components, the executable components comprising:
   a device component configured to send a trigger and receive an indication of readiness; and
   a data management component configured to, in response to receiving the trigger from the device component, read event data and write the event data to a historical repository, wherein the event data comprises a status of an event and a timestamp for the event; and in response to writing the event data to the historical repository, indicate to the device component a readiness for subsequent event data.

2. The apparatus of claim 1 wherein the device component is further configured to store the event data in a first-in, first-out (FIFO) queue, and move the event data to a transfer buffer prior to the event data being read.

3. The apparatus of claim 2 wherein the data management component is further configured to retrieve the event data from the transfer buffer.

4. The apparatus of claim 1 wherein the device component is further configured to receive the event data from an electronic device, and wherein the timestamp as written to the historical repository is unaltered relative to the timestamp as received by the device component.

5. The apparatus of claim 1 wherein the device component is further configured to identify, in the event data, an identification code that identifies the event.

6. The apparatus of claim 5 wherein the identification code further identifies an electronic device as a source of the event.

7. The apparatus of claim 4 wherein the electronic device comprises a relay device.

8. A method of operating a transaction management module in an industrial automation environment, the method comprising:
   in response to receiving a trigger from a device in an industrial automation environment, reading, by a system comprising a processor, event data from a location in a memory of the device and writing the event data to a historical repository, wherein the event data comprises a status of an event and a timestamp for the event; and
   in response to writing the event data to the historical repository, indicating, by the system, a readiness for subsequent event data.

9. The method of claim 8 further comprising storing, by the system, the event data in a first-in, first-out (FIFO) queue; and moving, by the system and to a transfer buffer, the event data, prior to being read.

10. The method of claim 9 further comprising retrieving, by the system, the event data from the transfer buffer.

11. The method of claim 8 further comprising receiving, by the system, the event data from an electronic device, wherein the timestamp as written to the historical repository is unaltered relative to the timestamp as received from the electronic device.

12. The method of claim 8 wherein the event data further comprises an identification code that identifies the event.

13. The method of claim 12 wherein the identification code further identifies an electronic device as a source of the event.

14. The method of claim 13 wherein the electronic device comprises a relay device that is external to the device.

15. One or more non-transitory computer-readable medium having stored thereon instructions that, in response to execution, cause a system comprising a processor to perform operations, the operations comprising:
   in response to receiving a trigger from a device in an industrial automation environment, reading event data from a location in a memory of the device and writing the event data to a historical repository, wherein the event data comprises a status of an event and a timestamp for the event; and
   in response to writing the event data to the historical repository, indicating a readiness for subsequent event data.

16. The one or more non-transitory computer-readable medium of claim 15 wherein the event data is stored in a first-in, first-out (FIFO) queue, and is moved to a transfer buffer prior to being read.

17. The one or more non-transitory computer-readable medium of claim 15 wherein the operations further comprise receiving, from an electronic device, the event data, and wherein the timestamp as written to the historical repository is unaltered relative to the timestamp as by received by the device.

18. The one or more non-transitory computer-readable medium of claim 15 wherein the event data further comprises an identification code that identifies the event.

19. The one or more non-transitory computer-readable medium of claim 18 wherein the identification code further identifies an electronic device as a source of the event.

20. The one or more non-transitory computer-readable medium of claim 19 wherein the electronic device comprises a relay device that is external to the device.

* * * * *